Figure 1:
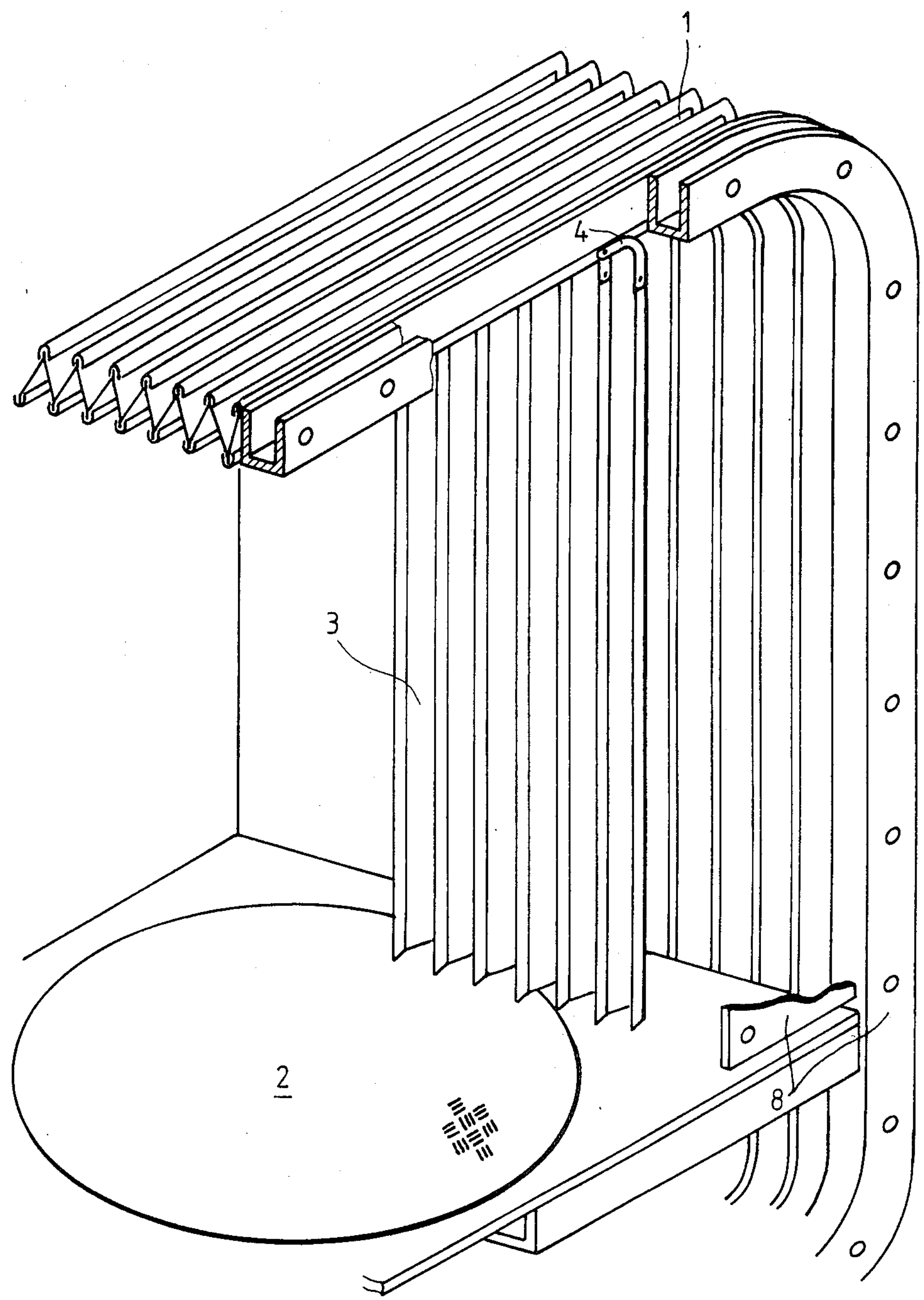

United States Patent [19]

Schmidt et al.

[11] Patent Number: 4,690,421

[45] Date of Patent: Sep. 1, 1987

[54] CROSSOVER SHELTER BETWEEN SECTIONS OF ARTICULATED ROAD AND RAIL VEHICLES

[75] Inventors: Helmbrecht Schmidt, Vellmar; Robert Koch, Bad Sooden-Allendorf; Richard Seyer, Baunatal, all of Fed. Rep. of Germany

[73] Assignee: Hubner Gummi-und Kunststoff GmbH, Kassel-Bettenhausen, Fed. Rep. of Germany

[21] Appl. No.: 788,489

[22] Filed: Oct. 17, 1985

[30] Foreign Application Priority Data

Oct. 31, 1984 [DE] Fed. Rep. of Germany ....... 3439807

[51] Int. Cl.[4] ......................... B60D 5/00; B61D 17/22

[52] U.S. Cl. ..................................... 280/403; 105/8.1; 105/18; 160/330; 181/287

[58] Field of Search .................... 280/403; 105/18, 15, 105/20, 8.1; 160/330, 23 R, 27; 181/287, 290

[56] References Cited

U.S. PATENT DOCUMENTS

| | | | |
|---|---|---|---|
| 503,160 | 8/1893 | Perry | 105/18 |
| 767,802 | 8/1904 | Donaldson | 105/18 |
| 870,054 | 11/1907 | Schroyer | 105/18 |
| 2,193,156 | 3/1940 | Antone | 105/8 R |
| 3,247,928 | 4/1966 | Poncet | 181/287 |
| 4,252,065 | 2/1981 | Bickel | 105/8 R |
| 4,318,345 | 3/1982 | Kleim | 105/18 |

FOREIGN PATENT DOCUMENTS 2617931 11/1977 Fed. Rep. of Germany ........ 105/18

*Primary Examiner*—John J. Love
*Assistant Examiner*—Everett G. Diederiks, Jr.
*Attorney, Agent, or Firm*—Alan H. Levine

[57] ABSTRACT

A gangway bellows is used as a cross-over shelter between two vehicles which are flexibly connected to each other. The sidewalls of the gangway bellows have a double-wall design. Each internal wall is constructed as a curtain, which is suspended at its upper end from the roof of the gangway bellows ànd ends with its lower end immediately above a crossover unit, between the vehicle sections, having a turntable. The inner walls cover the track groove and, between themselves and the side walls of the gangway bellows, form chambers in which service facilities can be accommodated. Each curtain is folded preferably to correspond to the gangway bellows. Support elements may be interposed between each curtain and the respective side wall of the bellows.

2 Claims, 3 Drawing Figures

CROSSOVER SHELTER BETWEEN SECTIONS OF ARTICULATED ROAD AND RAIL VEHICLES

Between the individual sections or cars of articulated road and rail vehicles, which are used to transport passengers, it is customary to have crossover platforms, which enable the passengers to move from one section of the vehicle to another. In order to permit such passenger movement while providing protection against the environment, it is customary to surround the crossover platforms with a crossover shelter. The crossover shelter frequently is a tubular or tunnel-shaped gangway bellows. Between the crossover platform and each of the vertical sidewalls of the gangway bellows, there is necessarily a gap which, particularly if the crossover platform is constructed as a turntable, is sufficiently large to require that it be covered so that the passengers are not exposed to injury.

Known means for providing such a cover are sheet metal covers which are attached at each side of the mutually facing ends of the vehicle sections by means of a bracket, and which are constructed as curved cylindrical sections about the vertical swivelling axis of the vehicle sections. It is also known that a railing may be attached to a crossover platform that is constructed as a turntable, in order to give the persons changing from one section to another a lateral support. In addition, a horizontally arranged cloth, each end of which is attached to one of the side walls of the bellows, is supported at the other end below the handrail by rings on a rod parallel to the handrail of the railing. Finally, it is also known that a diagonally extending skirt can be attached at a specified distance above the turn-table type crossover platform, to each side wall of the gangway bellows, and allowed to lie with its lower edge on the crossover platform. The skirts are folded to correspond to the gangway bellows walls.

To an increasing degree, demands are being made to raise the level of comfort offered to passengers and, moreover, to do so in the crossover regions of articulated vehicles. For the crossover region, the demand for increased comfort includes, in particular, demand for good insulation against noise and temperature. It must therefore be assumed that known gangway bellows do not adequately meet these demands.

With this background in mind, an object of the invention is to provde a device for covering the gaps between the gangway bellows and the turntable type crossover platform, which increases the level of comfort in the region of the gangway bellows with respect to noise and temperature insulation.

The invention is characterized by the gangway bellows arrangement being essentially of double-wall construction in the region of its vertical side walls. The outer sidewall is a part of the rotating bellows, and the inner sidewall, offset inwards as a covering for the gap between the outer side wall and the platform, is a curtain suspended from the roof of the bellows and extending from the roof of the bellows to the region of the crossover platform, so as to stand on the platform, or at least to end a short distance above it.

This means of accomplishing the object of the invention offers the advantage that considerable additional noise and temperature insulation in the region of the crossover between two sections of the vehicle is possible owing to the double-wall construction of the sidewalls of the gangway bellows and that, at the same time, the gaps between the actual gangway bellows, that is, the outer side walls of the bellows, and the crossover platform, is well covered. In the interior, the bellows have an optically satisfying, broad shape. Finally, the region between the inner and outer walls of the bellows may be used to accommodate equipment, cables, and wiring unobtrusively and in a protected manner.

Figure 1A:
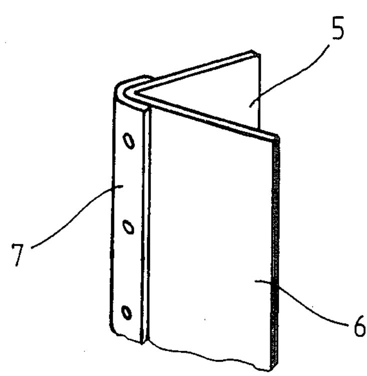
Figure 2:
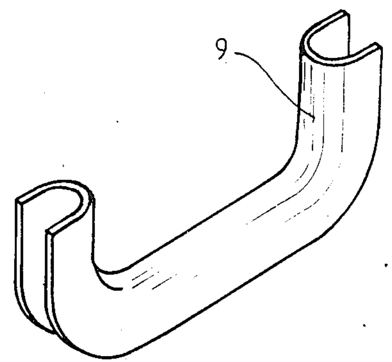

The invention is explained in greater detail with reference to the accompanying drawings. In the drawings:

FIG. 1 is a fragmentary perspective view of a covering according to the invention;

FIG. 1*a* is a fragmentary perspective view of a detail of the arrangement of FIG. 1; and FIG. 2 is a perspective view of a spacer for supporting the curtain by the gangway bellows.

FIG. 1 shows a conventional gangway bellows 1. It is usually arranged between the mutually opposed faces of two consecutive vehicle sections of a sectional vehicle, for example an articulated bus, and are attached at their ends to these faces. It forms a tube, which is closed around its entire periphery, is open at the both ends and surrounds a crossover platform including a turntable 2. It is customary to cover the gap between the crossover platform, having turntable 2, and the sidewall of the gangway bellows.

This covering is provided according to the present invention, by a double-wall construction of both sidewalls of the gangway bellows, preferably by use of a curtain 3. The curtain is folded to correspond to the gangway bellows, hangs downwards in front of the respective sidewall of the gangway bellows, and terminates with its lower end on the turntable or shortly above it. The suspension at the upper end is provided by angle brackets 4, the horizontal leg of which is attached to the roof of the gangway bellows and vertical leg of which is fastened to the curtain 3. The regions between the two curtains and the sidewalls of the gangway bellows can be used to install means for insulating against noise or temperature changes or for accommodating service facilities. Irrespective of what is accommodated in the regions between the curtains and bellows, the curtains offer an esthetically pleasing closed surface on the inside, and the gaps mentioned above are covered.

In its construction, each curtain corresponds to the sidewalls of the gangway bellows. To fabricate the curtains, for example, a number of individual widths 5 and 6 of rubbersized fabric are sewn together or glued to each other at their ends, so that a concertina-like folding results. As reinforcements, bars 7, U-shaped in cross section, are attached to the edges. Consequently, each curtain is adequately stiff in a vertical direction, and yet, on the other hand, sufficiently yielding as required when the vehicle passes around curves. So that the sidewalls of the gangway bellows and the curtains do not drift too far relative to each other, each curtain should be attached at each end, together with the corresponding end of the bellows, to a common gangway bellows frame 8, with which the arrangement is to be fastened to the ends of the vehicle.

Each curtain, so attached, is able to absorb, within limits, lateral bumps that arise, for example, when a passenger, crossing over from one vehicle to another, stumbles owing to the motion of the vehicles. However, in order to be able to absorb even greater lateral forces safely, each curtain may be supported below the point of its suspension, in a horizontal direction, relative to the corrsponding sidewall of the bellows. For this purpose, supporting elements 9 are provided as shown in FIG. 2. The same extruded material, from which the bars 7 are made, can be bent into U-shaped bows 9, each of which has a U-shaped cross section. The ends of bows 9 that are bent in the plane of the walls, are attached to the bars 7 of the respective sidewall of the bellows and the respective curtain, or slipped over the edges between widths 5 and 6, which have no such bars. In view of the elasticity of the legs of the U of the cross section, this should be possible without great difficulty. The length of the elongated part of the bow 9 between the bent ends of the bow, which is perpendicular to the wall surfaces, determines the distance between the side wall of the bellows and the curtain. Since increased lateral forces are to be expected especially at shoulder-level height of youthful persons, several such bows should be provided consecutively in the longitudinal direction of the vehicle, at least at this height. The number of supporting bows, arranged in the longitudinal direction of the vehicle, depends on the anticipated stress.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

We claim:

1. For use between two articulated vehicle sections having a crossover platform between them, each of the vehicle sections having an end facing the opposite end of the other vehicle section, a crossover shelter comprising:

a bellows in the form of a tube completely surrounding the crossover platform and a passageway region between the opposed ends of the vehicle sections, the bellows unit being accordion-folded and defining a roof portion and two opposite side walls of the passageway region, the side walls being spaced outwardly from the sides of the crossover platform so that a gap is present between each side wall and the crossover platform, a curtain spaced inwardly from each bellows side wall and spaced inwardly from the gap between its respective side wall and the crossover platform, each curtain being accordion-folded in a manner corresponding to the accordion folds of the bellows, and each curtain extending from the roof portion of the bellows to about the level of the upper surface of the crossover platform, a plurality of angle brackets for suspending each curtain from the roof portion of the bellows, one leg of each angle bracket being fixed to the roof portion of the bellows and the other leg of each angle bracket being fixed to the curtain, and a frame secured to each of the opposed ends of the two vehicle sections, one end of the bellows and the corresponding ends of the two curtains being fastened to each of the frames, whereby the crossover shelter is secured between the opposed vehicle ends.

2. A crossover shelter as defined in claim 1 wherein each of the bellows and curtains is fabricated of strips of material joined along their longitudinal edges by U-shaped bars which define the folds therein, and a plurality of spacer elements between each curtain and its respective bellows side wall, each spacer element being a single piece having a U-shape and a U-shaped cross-section, the intermediate section of each element extending horizontally between each curtain and its respective side wall, and the two ends of the element gripping a U-shaped bar of each of the curtains and bellows, respectively.

* * * * *